United States Patent
Kain

(10) Patent No.: US 6,779,843 B2
(45) Date of Patent: Aug. 24, 2004

(54) HARNESS-CONTROL PANEL ADJUSTER FOR CHILD-RESTRAINT SEAT

(75) Inventor: James M. Kain, Troy, OH (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 10/330,812

(22) Filed: Dec. 27, 2002

(65) Prior Publication Data

US 2004/0124676 A1 Jul. 1, 2004

(51) Int. Cl.[7] .............................. A47C 1/08; A47C 31/00
(52) U.S. Cl. ..................................... 297/250.1; 297/484
(58) Field of Search ............................... 297/250.1, 484

(56) References Cited

U.S. PATENT DOCUMENTS

| | | |
|---|---|---|
| 4,040,664 A | 8/1977 | Tanaka et al. |
| 4,047,755 A | 9/1977 | McDonald et al. |
| 4,342,483 A | 8/1982 | Takada |
| 4,376,551 A | 3/1983 | Cone |
| 4,545,617 A | 10/1985 | Drexler et al. |
| 4,632,456 A | 12/1986 | Kassai |
| 4,709,960 A | 12/1987 | Launes |
| 4,790,601 A | 12/1988 | Burleigh et al. |
| 4,854,639 A | 8/1989 | Burleigh et al. |
| 4,858,997 A | 8/1989 | Shubin |
| 4,915,446 A | 4/1990 | Darling et al. |
| 5,082,325 A | 1/1992 | Sedlack |
| 5,181,761 A | 1/1993 | Meeker |
| 5,335,964 A | 8/1994 | Sedlack et al. |
| 5,344,213 A | 9/1994 | Koyanagi |
| 5,468,046 A | 11/1995 | Weber et al. |
| 5,527,094 A | 6/1996 | Hiramatsu et al. |
| 5,580,126 A | 12/1996 | Sedlack |
| 5,775,772 A | 7/1998 | Lefranc |
| 6,030,047 A | 2/2000 | Kain |
| 6,155,638 A * | 12/2000 | Bapst ....................... 297/250.1 |
| 6,189,970 B1 | 2/2001 | Rosko |
| 6,491,348 B1 | 12/2002 | Kain |
| 6,623,074 B2 * | 9/2003 | Asbach et al. ............ 297/250.1 |
| 2002/0195867 A1 * | 12/2002 | Barger et al. ................ 297/484 |

FOREIGN PATENT DOCUMENTS

| | | | |
|---|---|---|---|
| GB | 2143727 A * | 2/1985 | ............ B60N/1/12 |
| GB | 2 282 32 1 | 4/1995 | |

* cited by examiner

Primary Examiner—Peter M. Cuomo
Assistant Examiner—Sarah C. Burnham
(74) Attorney, Agent, or Firm—Barnes & Thornburg LLP

(57) ABSTRACT

A child-restraint seat includes a seat shell, a child-restraint harness coupled to the seat shell, and a harness-control panel including a belt-receiving opening receiving a shoulder belt portion of the child-restraint harness. The harness-control panel is mounted on the seat shell for up and down movement relative to the seat shell to raise and lower the shoulder belt portion of the child-restraint harness with respect to the seat shell. The child-restraint seat further includes a panel-height adjustment mechanism coupled to the harness-control panel and movable between a locked position to prevent the harness-control panel from moving up and down relative to the seat shell and an unlocked position to allow the harness-control panel to move up and down relative to the seat shell. The panel-height adjustment mechanism is accessible to a user from both a front side and a rear side of the child-restraint seat.

29 Claims, 7 Drawing Sheets

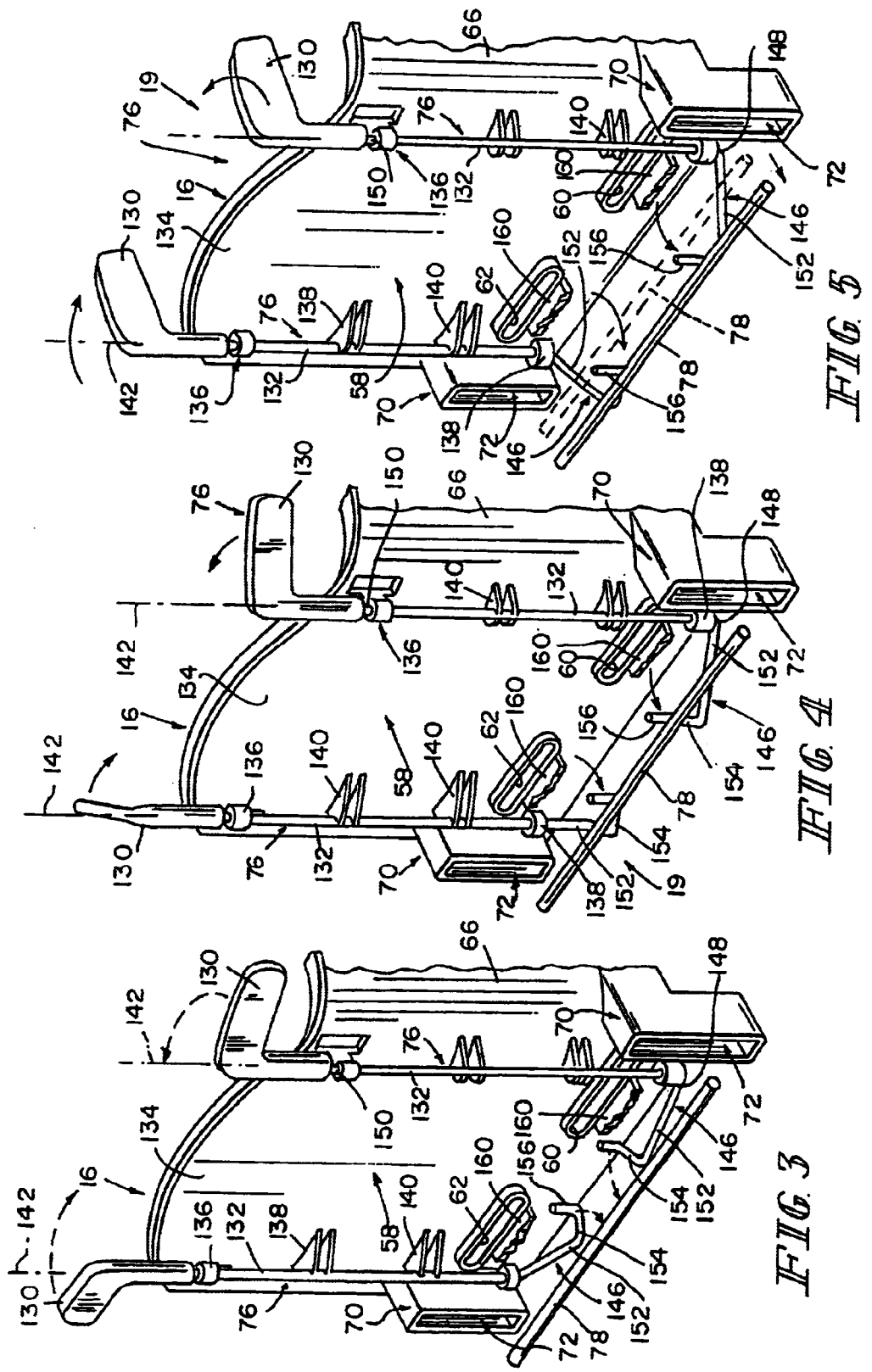

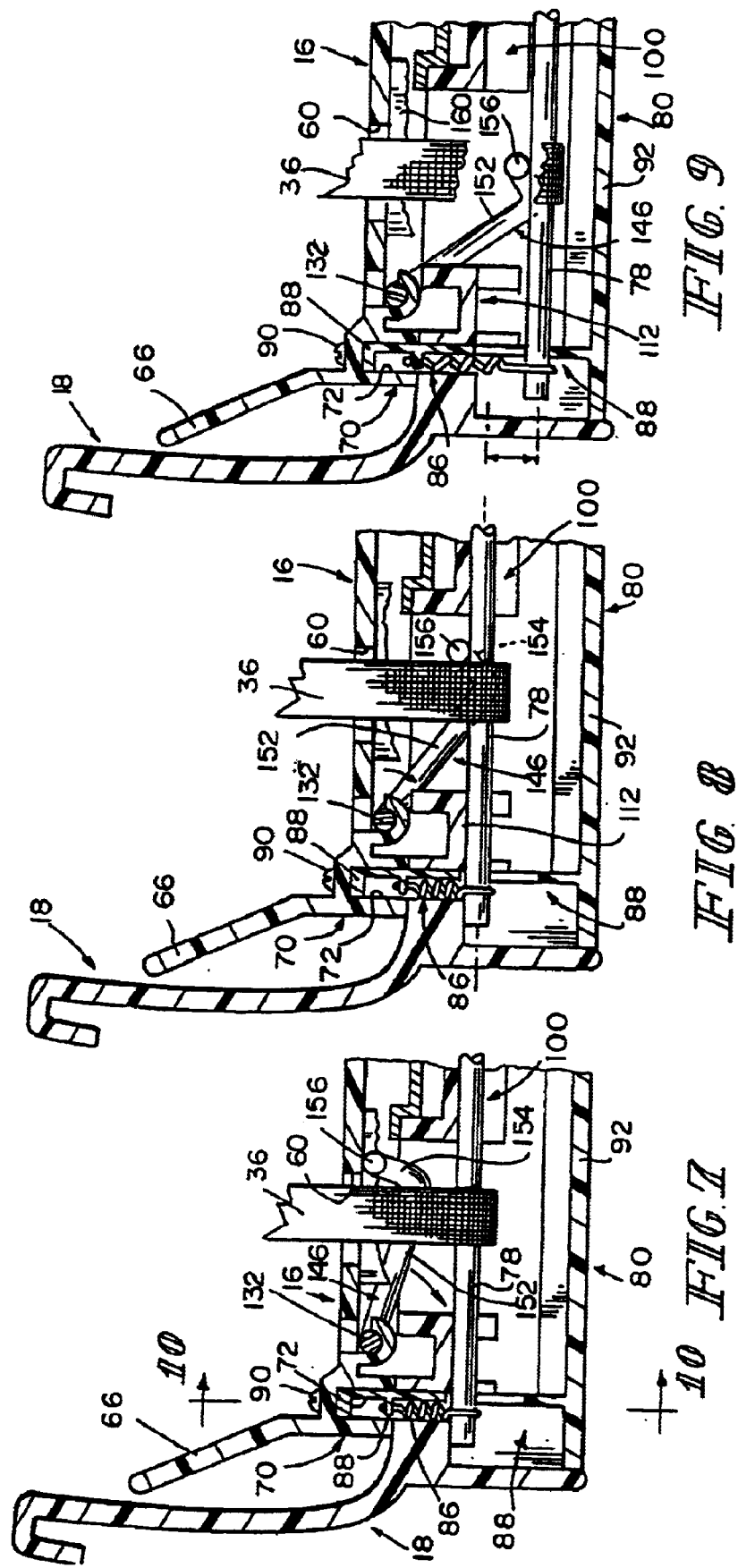

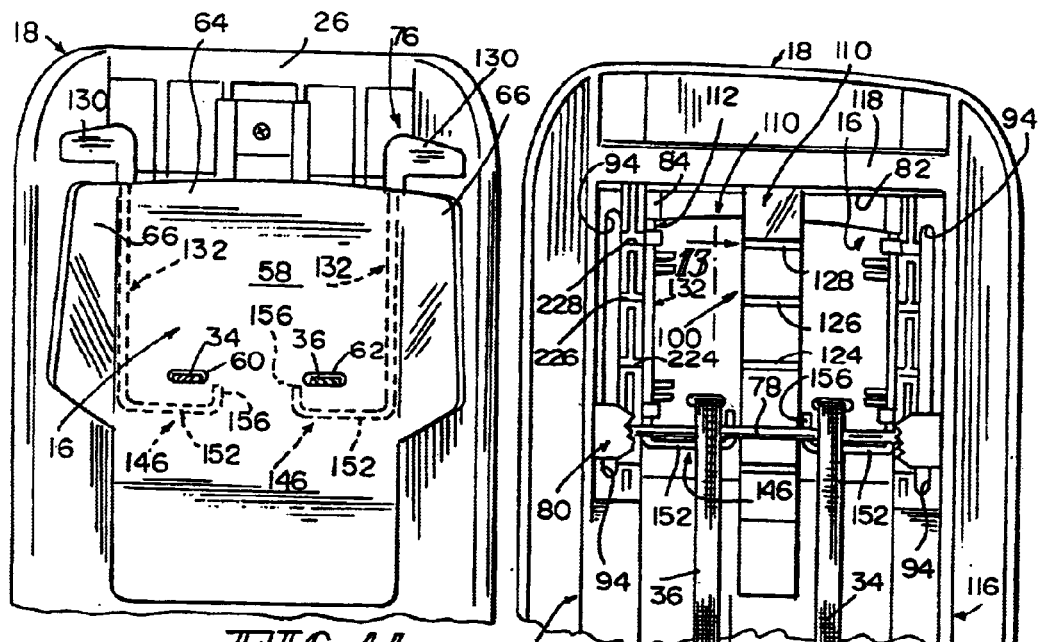
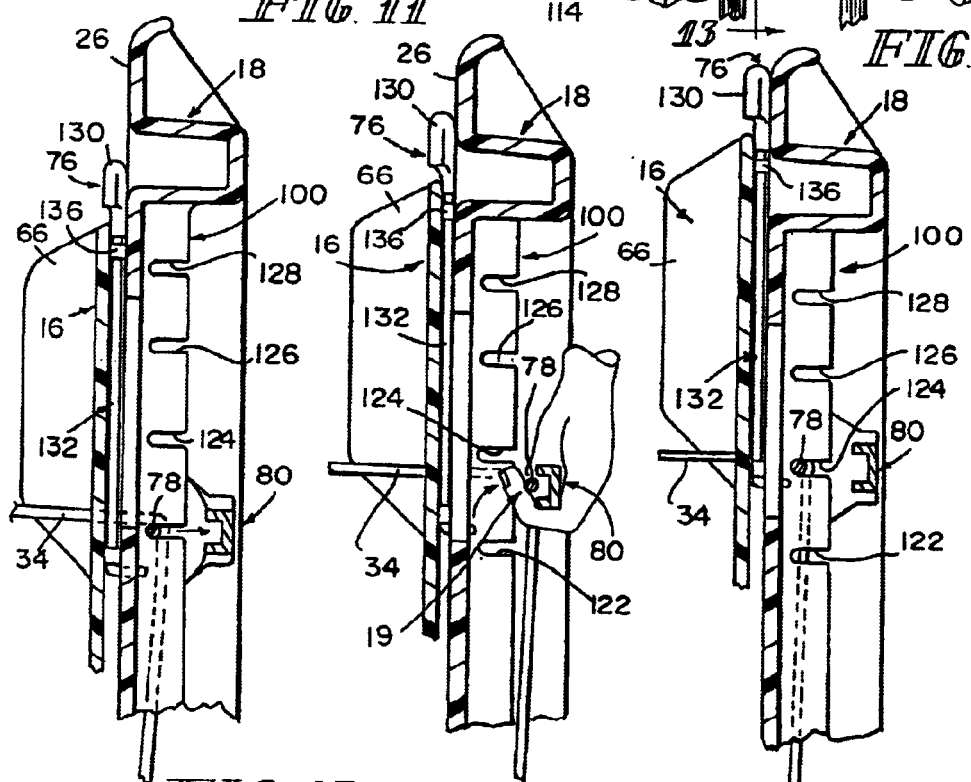

HARNESS-CONTROL PANEL ADJUSTER FOR CHILD-RESTRAINT SEAT

BACKGROUND AND SUMMARY

The present disclosure relates to seats for use by juveniles in vehicles and, particularly, to seats having child-restraining harness belts and to seats configured to seat older children in a restrained fashion using adult vehicle lap and shoulder belts. More particularly, the present disclosure relates to a child vehicle seat with a child-restraint harness adjustment mechanism and to a child vehicle seat with a headrest adjustment mechanism.

Many juvenile vehicle seats are formed to include several sets of shoulder belt-receiving apertures in a back wall of the juvenile vehicle seat so that the seat can be adapted by a user to restrain juveniles of different sized juveniles of different sizes. To accommodate an infant, the two shoulder belts are uncoupled from other portions of the car seat harness, passed through a lowest pair of shoulder belt-receiving apertures formed in the back wall of the car seat, and then recoupled to the car seat harness.

As the infant grows, the caregiver must repeat the belt installation procedure described above using other higher sets of belt-receiving apertures formed in a higher portion of the back wall of the car seat to enlarge the child car seat harness to accommodate the growing child. U.S. Pat. No. 6,030,047 to James M. Kain, which patent is hereby incorporated by reference herein, and U.S. application Ser. No. 09/628,459 to James M. Kain, which application is hereby incorporated by reference herein, each discloses a car seat that is adaptable to hold infants, toddlers, and juveniles and, in particular, is adaptable to adjust the size of the child-restraint harness quickly and easily to accommodate children of various sizes in the child car seat.

According to the present disclosure, a child-restraint seat is includes a seat shell, a child-restraint harness coupled to the seat shell, and a harness-control panel including a belt-receiving opening receiving a shoulder belt portion of the child-restraint harness. The harness-control panel is mounted on the seat shell for up and down movement relative to the seat shell to raise and lower the shoulder belt portion of the child-restraint harness with respect to a bottom seat portion of the seat shell. The child-restraint seat further includes a panel-height adjustment mechanism coupled to the harness-control panel. The adjustment mechanism is accessible to a user from both a front side and a rear side of the child-restraint seat. The adjustment mechanism is movable between a locked position to prevent the harness-control panel from moving up and down relative to the seat shell and an unlocked position to allow the harness-control panel to move up and down relative to the seat shell.

Illustratively, the harness-control panel includes a headrest positioned to lie adjacent to a front surface of a back support portion of the seat shell to cause a child seated in the seat shell to rest against the harness-control panel. The panel-height adjustment mechanism includes one or more of the following features: a locking member, an actuator, and a handle bar.

The locking member is coupled to the harness-control panel and is engaged with the seat shell when the adjustment mechanism is in the locked position and is disengaged from the seat shell when the adjustment mechanism is in the unlocked position. Illustratively, the locking member is a bar receivable within one or more panel-height locators or slots positioned at various heights along the back support portion of the seat shell. Further, the locking member illustratively supports the shoulder belt portion of the child-restraint harness for up and down movement with the harness-control panel relative to the seat shell.

The illustrative actuator is coupled to the harness-control panel for up and down movement therewith. The actuator is also movable relative to the harness-control panel to move the locking member from the engaged position to the disengaged position. The actuator is positioned adjacent a front surface of the back support portion of the seat shell and is accessible to a user from a front side of the child-restraint seat. The child-restraint seat may include one or more actuators.

The illustrative handle is coupled to the harness-control panel for up and down movement therewith. The locking member is received within a channel of the handle for back and forth sliding movement relative to the handle and relative to the harness-control panel. The locking member is spring-biased in a direction toward the back support portion of the seat shell for engagement with one of the panel-height locators of the seat shell.

Additional features of the disclosure will become apparent to those skilled in the art upon consideration of the following detailed description of preferred embodiments exemplifying the best mode of carrying out the disclosure as presently perceived.

BRIEF DESCRIPTION OF THE DRAWINGS

The detailed description particularly refers to the accompanying figures in which:

FIGS. 3–5 are rear perspective views, with portions broken away, of the harness-control panel and adjustment mechanism coupled to the panel showing rotational movement of two actuators of the adjustment mechanism to engage the belt-support bar and move the belt-support bar out of engagement with one of the slots (not shown) formed in the bar-anchor member (not shown);

FIGS. 7–9 are transverse sectional views, with portions broken away, taken along line 7—7 of FIG. 6 showing movement of a foot portion of one of the actuators to engage the belt-support bar and move the belt-support bar from a locked position within one of the position locator slots (not shown) to an unlocked position removed from one of the position locator slots;

FIG. 11 is a front elevation view of an upper portion of the seat showing the harness-control panel in a lowest position relative to the seat shell;

FIG. 12 is a rear elevation view of the upper portion of the seat shown in FIG. 11 showing the two shoulder belts, the belt-support bar, the handle bar (shown with portions broken away), and the slotted vertical center and outer support bar anchor members for receiving a portion of the belt-support bar;

FIGS. 13–15 show a sequence of steps in which the belt-support bar is removed by a user from within one of the slots of the anchor member to raise the harness-control panel from a lowest position to a next highest position;

FIG. 13 is a sectional view taken along line 13—13 of FIG. 12 showing the belt-support bar retained in the first slot formed in bar-anchor member;

FIG. 14 is a sectional view similar to FIG. 13 showing upward movement of the harness-control panel relative to the seat shell after a user has pulled the belt-support bar to the right toward the handle bar to release the belt-support bar from the first slot in order to raise the handle bar and the belt-support bar together, thus raising the harness-control panel;

FIG. 15 is a sectional view similar to FIGS. 13 and 14 showing engagement of the belt-support bar in the second slot to establish a fixed raised position of the harness-control panel relative to the seat shell above the lowest position shown in FIG. 13 and showing the shoulder belts passing through the seat shell when the harness-control panel occupies its second position at a point that is higher than the seat shell entry point of the shoulder belts when the harness-control panel occupies its lowest position;

DETAILED DESCRIPTION

Figure 1:
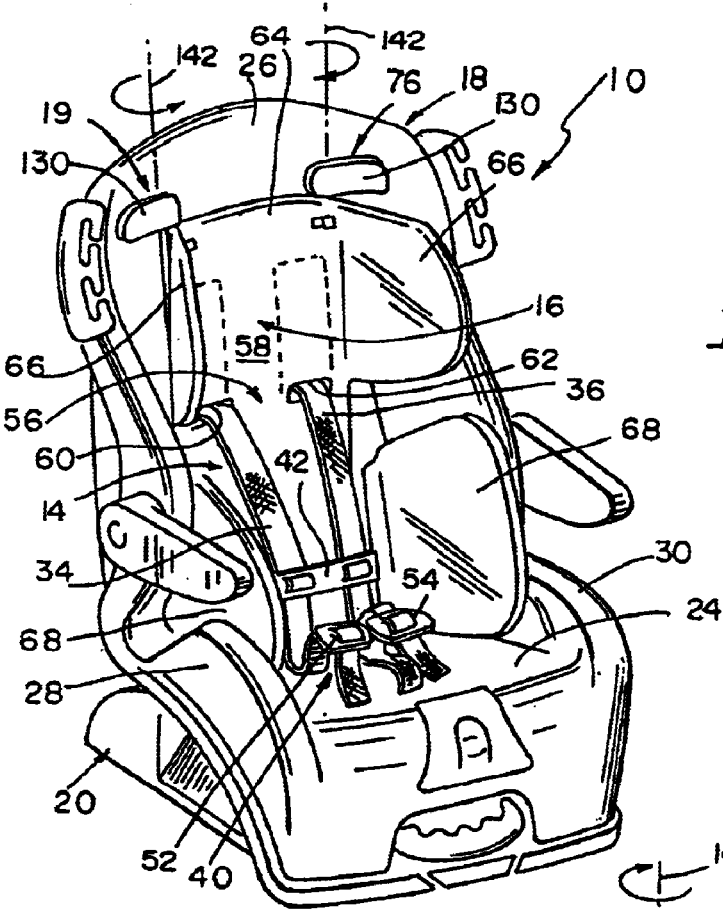
FIG. 1 is a front perspective view of a seat including a seat shell, a base, a child-restraint harness coupled to the seat shell, and a harness-control panel movable up and down relative to the seat shell (in a position behind a child seated in the seat shell) by a panel-height adjustment mechanism (which includes two grips shown to extend above the harness-control panel) to adjust the height of shoulder belts of the child-restraint harness relative to a bottom seat portion of the seat shell to adapt the seat for use by both small-sized and large-sized children.
Figure 2:
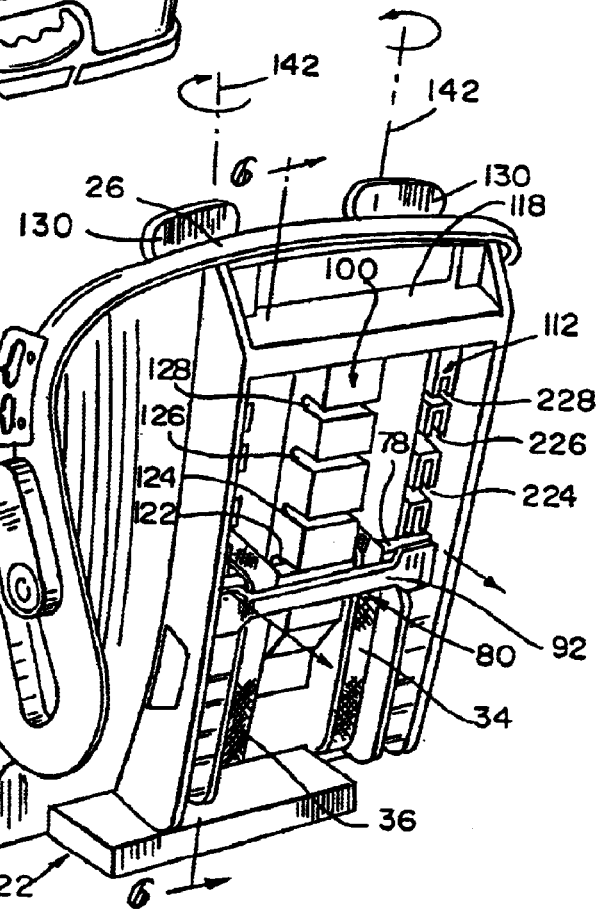
FIG. 2 is a rear perspective view of the seat of FIG. 1 showing two shoulder belts of the child-restraint harness extending along a back side of the seat shell and engaging a horizontal belt-support bar of the adjustment mechanism which is shown to be positioned within a slot of a vertical bar-anchor member formed in the seat shell.
Figure 6:
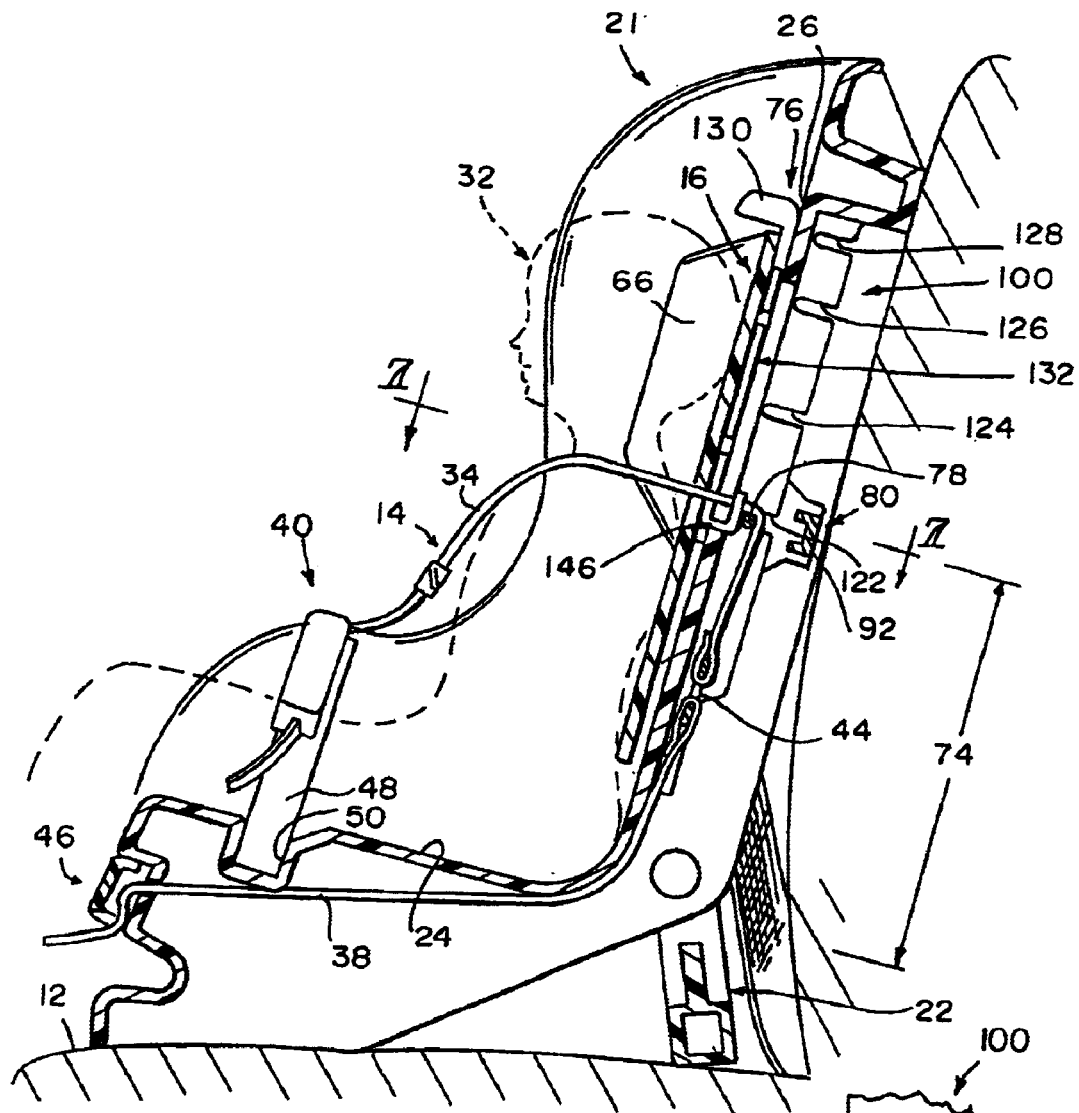
FIG. 6 is a sectional view of the seat of FIGS. 1 and 2 taken along line 6—6 of FIG. 2 showing the child-restraint harness coupled to the seat shell and engaging the belt-support bar of the adjustment mechanism to restrain a child (shown in phantom) seated in the seat and showing the harness-control panel in a lowest one of four available positions (with the shoulder belts passing therethrough) and retained in such a position by the belt-support bar.

A child-restraint seat 10 is shown in FIGS. 1 and 2 and is configured to be used on a vehicle seat 12, as shown in FIG. 6. Child-restraint seat 10 includes a child-restraint harness 14 and a harness-control panel 16 designed to accommodate both younger, smaller children and older, larger children and is arranged to lie between a seat shell 18 of seat 10 and a child 32 seated on seat 10. Seat 10 further includes a panel-height adjustment mechanism 19 coupled to panel 16 to move panel 16 up and down relative to seat shell 18 in order to accommodate children of various sizes.

Panel-height adjustment mechanism 19 includes a front-access means for moving panel 16 up and down (as shown in FIGS. 3–5) and a rear-access means for moving panel 16 up and down (as shown in FIGS. 13–15). Panel-height adjustment mechanism 19 as is discussed in more detail below. The front-access means allows a caregiver to adjust the height of panel 16 relative to seat shell 18 from a front side 21 of seat 10 such as when seat 10 in a forward facing position on vehicle seat 12 (as shown in FIG. 6), for example, while rear-access means allows the caregiver to adjust the height of panel 16 from a rear side 23 of seat 10 such as when seat 10 is in a rearward facing position on vehicle seat 12.

Seat 10 further includes a base 20 and a pivotable support leg 22, as shown in FIGS. 1, 2, and 6. In addition to providing adjustable harness-control panel 16, which moves up and down relative to seat shell 18 to accommodate children of various sizes, child-restraint seat 10 can also be converted for use as a forward-facing seat or a rearward-facing seat to further accommodate children of various sizes. This conversion can be accomplished by movement of seat shell 18 relative to base 20 and/or by movement of pivotable support leg 22 relative to seat shell 18. Although seat shell 18 is shown as a one-piece molded body in the illustrated embodiment, it is within the scope of this disclosure to use a multiple-piece body as well.

Seat shell 18 includes a bottom seat portion 24 to support a child's bottom and upper legs and a back support portion 26 positioned at an angle to bottom seat portion 24, as shown in FIG. 1. As shown, for example, in FIGS. 13–15, harness-control panel 16 is movable up and down relative seat shell 18 to adjust a height of panel 16 above bottom seat portion 24 to accommodate larger as well as smaller children on seat 10.

First and second side wall portions 28, 30 of seat shell 18 lie on opposite sides of bottom seat portion 24, as shown in FIG. 1, and generally prevent lateral movement of a child 32 (shown in phantom in FIG. 6) in seat 10. A cushion or seat cover (not shown) can cover portions of seat shell 18 including bottom seat portion portion, back support portion, and/or first and second side wall portions 24, 26, 28, 30 for added comfort and/or appearance.

As mentioned above, harness 14 is provided to restrain a child's movement relative to seat shell 18. Harness 14 includes shoulder belts 34, 36, a lower belt 38, and a buckle unit 40, as shown in FIGS. 1 and 6. A harness-retainer 42 is used to hold shoulder belts 34, 36 together, as shown in FIG. 1. One end of lower belt 38 is coupled to shoulder belts 34, 36 by a junction member 44 and another end of lower belt 38 is coupled to seat shell 18 by a belt-adjustment mechanism 46, as shown in FIG. 6. Buckle unit 40 includes a frame 48 selectively coupled to a connector 50 on bottom seat portion 24, a first buckle 52 coupling first shoulder belt 34 to frame 48, and a second buckle 54 coupling second shoulder belt 36 to frame 48. Seat 10 can be adapted to receive other styles of harnesses (not shown) and a combination of a harness and a movable barrier shield (not shown).

Harness-control panel 16 is positioned in a child-receiving space 56 defined in a front portion or front side 21 of seat 10 and is mounted for up-and-down movement relative to bottom seat portion 24 of seat 10, as shown best in FIGS. 13–15. Up-and-down movement of panel 16 functions to raise and lower the "height" of shoulder belts 34, 36 above bottom seat portion 24 to adapt seat 10 to accommodate young, small-sized children or older, larger-sized children.

Panel 16 includes a back plate 58 having shoulder belt-receiving slots 60, 62 and a headrest 64 in an upper portion of back plate 58 generally above slots 60, 62. Panel 16 also includes upper and lower wing members 66, 68 each coupled to opposite sides of back plate 58 and positioned in spaced-apart relation to one another. Illustratively, each of the upper and lower wing members 66, 68 are positioned to lie at an angle relative to back plate 58 as shown, for example, in FIG. 1. Illustrative lower wing members 68 are removable from back plate 58, as shown, for example, in FIGS. 11, 16, 18, and 20. Up-and-down movement of panel 16 also functions to raise and lower the height of headrest 64 above bottom seat portion 24 to adapt seat 10 to accommodate children of various ages and sizes. As shown, for example, in FIGS. 13–19, shoulder belts 34, 36 and headrest 64 move up and down together relative to seat shell 18 to assure proper shoulder belt fit for a child seated in seat 10.

As shown best in FIGS. 3–5, panel 16 further includes first and second support arms 70 coupled to a rear side 134 of both back plate 58 and upper wing members 66. Arms 70 are spaced apart from one another and extend away from rear side 134 of back plate 58. Each arm 70 defines a cavity 72 for receiving a portion of the panel-height adjustment mechanism 19 therein to couple panel 16 and mechanism 19 together, as is discussed in more detail below.

Back support portion 26 of seat shell 18 and back plate 58 of panel 16 cooperate to set a nominal height 74 (see FIG. 6) of first and second shoulder belts 34, 36 above bottom seat portion 24 of seat shell 18. A caregiver can raise and lower panel 16 easily to change the height of first and second shoulder belts 34, 36 by operating panel-height adjustment mechanism 19 of seat 10. As mentioned above, panel-height adjustment mechanism 19 may be operated from both the front side 21 of seat 10 and the rear side 23 of seat 10 to move panel 16 (with shoulder belts 34, 36) up and down relative to seat shell 18.

Adjustment mechanism 19 includes two bar actuators 76 (shown best in FIGS. 3–5 and shown extending above panel 16 in FIGS. 1 and 2) coupled to panel 16, a belt-support bar 78 (also shown best in FIGS. 3–5), and a handle bar 80 (shown in FIG. 2 and FIGS. 7–9) coupled to panel 16 as well. Additional features and operation of the adjustment mechanism 19 are discussed in greater detail below. Generally, however, actuators 76 are accessible by a caregiver from front side 21 of seat 10, while handle bar 80 and belt-support bar 78 are each accessible by a caregiver from rear side 73 of seat 10.

Back support portion 26 includes two vertical channels 82, 84 shown, for example, in FIG. 1 (in phantom). The channels 82 are aligned in spaced-apart relation to lie "behind" back plate 58 of panel 16 so first shoulder belt 34 can pass through first channel 82 and second shoulder belt 36 can pass through second channel 84. As mentioned before, panel 16 includes a pair of spaced-apart horizontally extending, elongated belt-receiving slots 60, 62, as shown in FIGS. 1, 11, 16 and 18.

First slot 60 is sized to receive a portion of first shoulder belt 34 and to allow the portion of first shoulder belt 34 to also pass through first channel 82. First channel 82, formed in back support portion 26, is arranged to lie in communication with belt-receiving slot 60 formed in panel 16 to enable movement of a portion of first shoulder belt 34 in slot 60 and first channel 82 during up and down movement of panel 16 relative to seat shell 18.

Similarly, second slot 62 is sized to receive a portion of second shoulder belt 36 and to allow the portion of second shoulder belt 36 to also pass through second channel 84. Second channel 84, formed in back support portion 26, arranged to lie in communication with belt-receiving slot 62 formed in panel 16 to enable movement of a portion of second shoulder belt 36 in slot 62 and second channel 84 during up and down movement of panel 16 relative to seat shell 18.

The height of panel 16 above bottom seat portion 24 determines the nominal height 74 (i.e. seat shell 18 entry point) of the first and second shoulder belts 34, 36. Seat 10 can be adjusted to accommodate young, small-sized children by moving panel 16 to its lowest position shown, for example, in FIGS. 1, 11, and 12 to minimize nominal height 74 and cause the seat shell entry points of shoulder belts 34, 36 to be lowered. In this position, it is contemplated that harness 14 will be used to restrain a young, small-sized child 32 seated in child-restraint seat 10, as shown in FIG. 6. Child-restraint seat 10 can also be adjusted to assume other positions to accommodate somewhat older, larger children in child-restraint seat 10 by raising panel 16 upwardly relative to back support portion 26 of seat shell 18 to increase nominal height 74 and cause the seat shell entry point of shoulder belts 34, 36 to be raised. As mentioned above, panel 16 (with shoulder belts 34, 36) is raised up and down by panel-height adjustment mechanism 19, accessible to a caregiver from both the front side 21 and rear side 23 of seat 10.

Figures 20, 21:
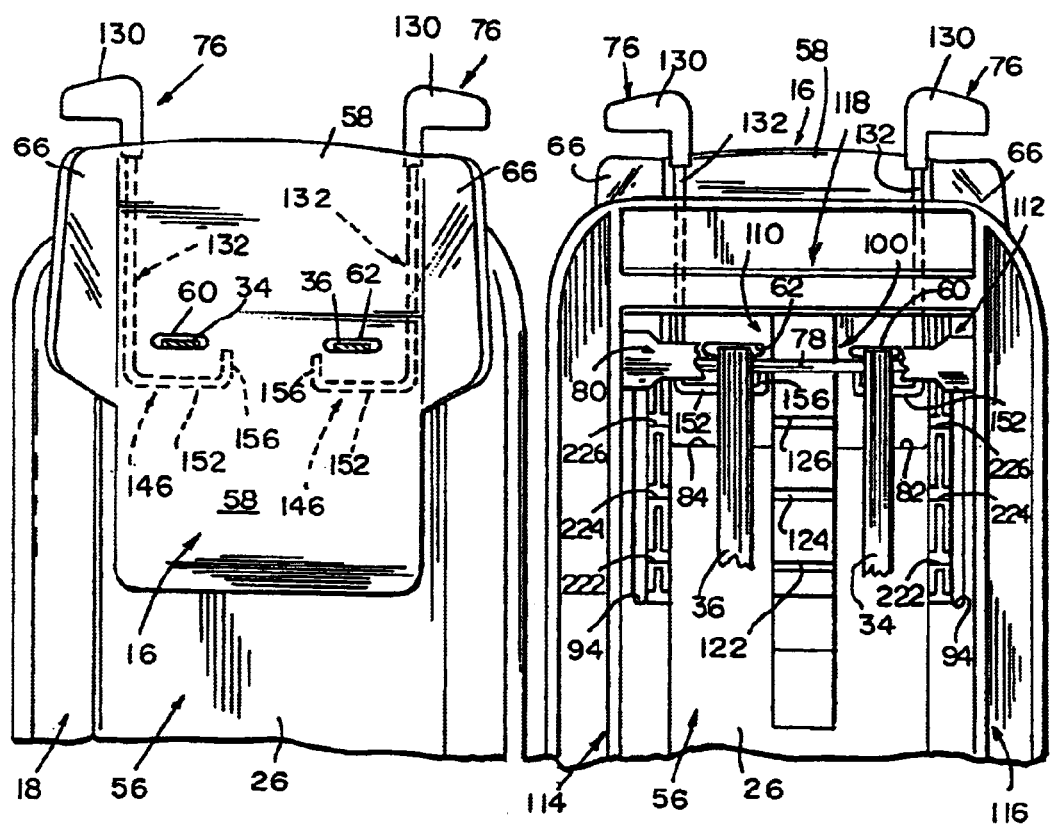
FIG. 20 is a front elevation view similar to FIGS. 11, 16 and 18 showing the harness-control panel in a fourth position and showing the two belt-receiving slots of the harness-control panel above vertical guide slots (shown in phantom) of the seat shell.
FIG. 21 is a rear elevation view similar to FIGS. 12, 17 and 19 showing the belt-support bar engaged with a fourth slot of the bar-anchor member.

Child-restraint seat 10 can also be adjusted to accommodate even older, larger-sized children by moving panel 16 to its highest position shown, for example, in FIGS. 20 and 21. In this position, it is contemplated that harness 14 will be removed from child-restraint seat 10 (or tucked in an out-of-the-way, unused position) and that an adult three-point vehicle lap/shoulder belt (not shown) will be used to restrain a child seated in child-restraint seat 10. In its highest position, harness-control panel 16 is used primarily to support headrest 64 in a proper elevated position relative to bottom seat portion 24. Panel 16 is not used to control the seat shell entry points of shoulder belts 34, 36 since those belts are not used to restrain a child in child-restraint seat 10 in such a configuration. As such, first belt-receiving slot 60 does not communicate with first channel 82 and second belt-receiving slot 62 does not communicate with second channel 84 when panel 16 and its headrest 64 is positioned in its highest position.

As mentioned before, panel-height adjustment mechanism 19 includes actuators 76 each coupled to panel 16, belt-support bar 78, and handle bar 80 also coupled to panel 16. Belt-support bar 78 is movably coupled to handle bar 80 and is therefore coupled to panel 16 through handle bar 80. Actuators 76 rotate relative to panel 16 to engage belt-support bar 78, as shown in FIGS. 3–5. Mechanism 19 further includes a pair of springs 86 each coupled to both handle bar 80 and belt-support bar 78. Handle bar 80 includes spaced-apart arms 88 each received within cavity 72 of the respectively aligned support arm 70 of panel 16, as shown in FIGS. 7–9, for up and down movement therewith.

Figure 10:
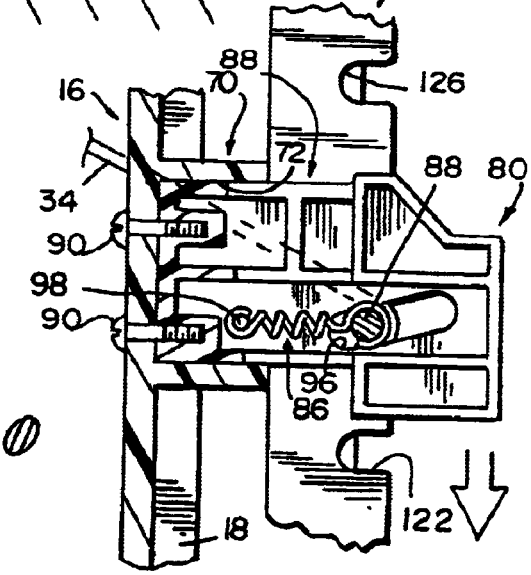
FIG. 10 is a sectional view taken along line 10—10 of FIG. 7 through a handle bar of the adjustment mechanism showing a first arm of the handle bar received within a cavity formed by a support arm of the harness-control panel and coupled to the harness-control panel by a screw so that the harness-control panel and handle bar move together in a generally vertical direction when the belt-support bar is removed from within one of the position locator slots.

Each arm 88 is secured to panel 16 by a screw 90, as shown in FIG. 10. Handle bar 80 further includes a grip member 92 coupled to and positioned to extend between spaced-apart arms 88.

Each arm 88 of handle bar 80 passes through a respective vertical guide slot 94 formed in back support portion 26 of seat shell 18. Guide slots 94 are formed in back support portion 24 of seat shell 18 and lie in spaced-apart, parallel relation to one another. Each arm 88 (coupled to a respective support arm 70 of panel 16) reciprocates in each respective guide slot 94 as panel 16 moves up and down relative to back support portion 24 between a lowest position (shown, for example, in FIGS. 1, 11, and 12) adapted to suit a young, small-sized child and a highest position (shown, for example, in FIGS. 20 and 21) adapted to suit an older, larger-sized child.

Each arm 88 of handle bar 80 includes a guide channel 96, as shown in FIG. 10. Belt-support bar 78 is received within each guide channel 96 so that belt-support bar 78 is coupled to and positioned to extend between spaced-apart arms 88 of handle bar 80. Further, belt-support bar 78 is slidably movable within guide channels 96 (relative to handle bar 78) in a generally horizontal direction toward or away from back support portion 26 of seat shell 18.

As shown in FIG. 10, each arm 88 includes a spring mount 98 for receiving one end of one of the tension springs 86 of panel-height adjustment mechanism 19. Each tension spring 86 is coupled to and positioned to extend between the respective spring mount 98 and belt-support bar 78. Tension springs 98 function to normally bias belt-support bar 78 in a locked position in engagement with seat shell 12 as shown in FIGS. 6, 7, 10, and 13. While the figures show the springs 98 to be tension springs, one could use compression springs located between belt-support bar 78 and grip member 92 of the handle bar 80 as well.

Seat shell 18 further includes a center vertical bar-anchor member 100 coupled to a rear side of back support portion 26 to lie in a space 110 midway between first and second vertical back ribs 114, 116 of seat shell 18. An upper end of bar-anchor member 100 is coupled to a mid-portion of a horizontal back rib 118, as shown in FIG. 2. Bar-anchor member 100 includes a plurality of panel height locators such as vertically spaced-apart slots (e.g. slots 122, 124, 126, and 128), for receiving belt-support bar 78 therein to establish a fixed or locked position of belt-support bar 78, handle bar 80 and panel 16 relative to the underlying bottom seat portion 24 of seat shell 18.

Figure 16:
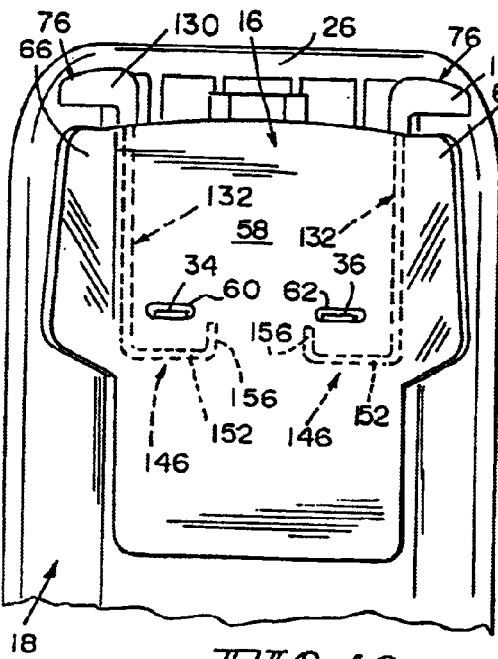
FIG. 16 is a front elevation view similar to FIG. 11 showing the harness-control panel in its second position (corresponding to the position shown in FIG. 15)
Figure 17:
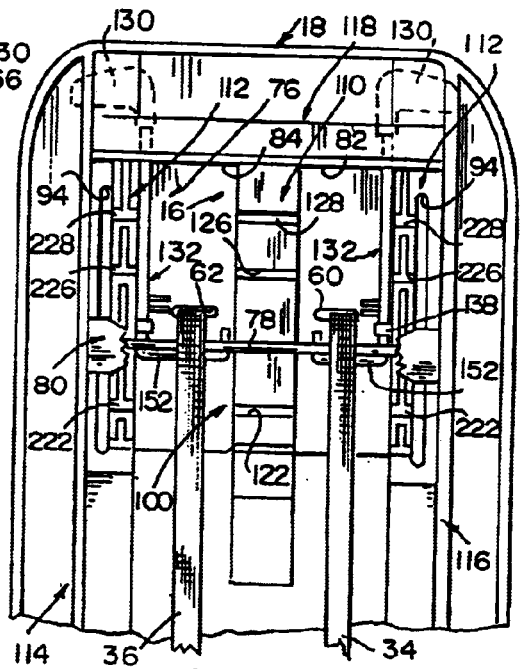
FIG. 17 is a rear elevation view similar to FIG. 12 showing the upper portion of the seat shown in FIG. 16 wherein the belt-support bar engages the second slot formed in the bar-anchor member.
Figure 18:
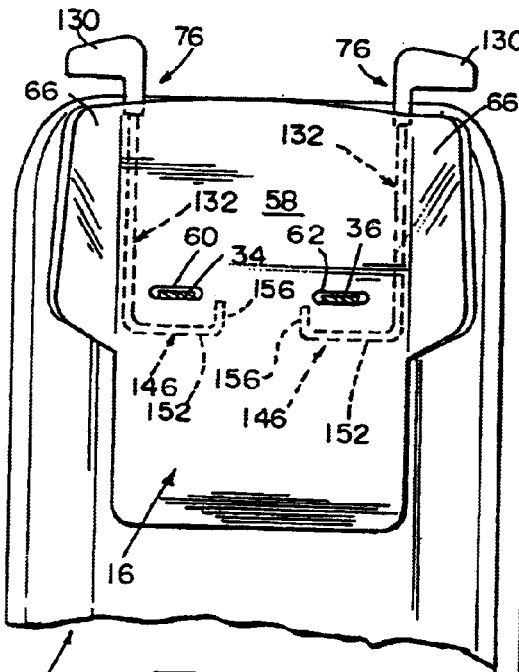
FIG. 18 is a front elevation view similar to FIGS. 11 and 16 showing the harness-control panel in a third position raised above the second position shown in FIG. 16.
Figure 19:
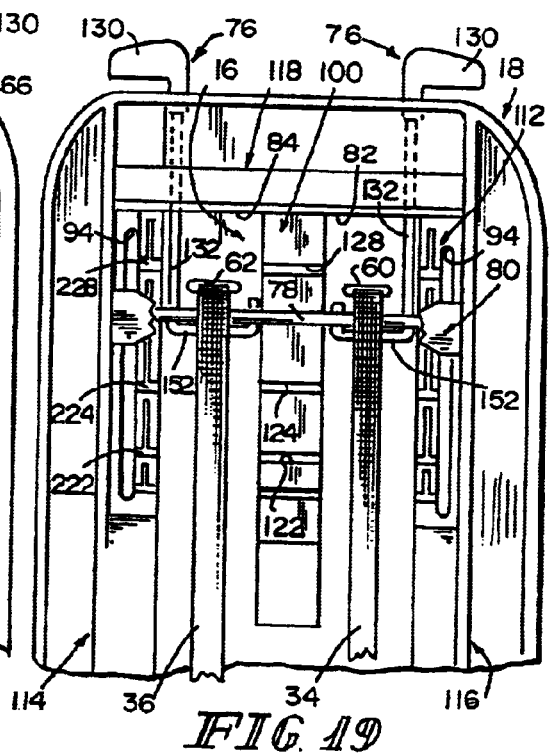
FIG. 19 is a rear elevation view similar to FIGS. 12 and 17 showing the upper portion of the seat shown in FIG. 18 wherein the belt-support bar engages a third slot formed in the bar-anchor member.

Belt-support bar 78 is received within one of the slots, 122, 124, 126, or 128 when in the locked position. Slot 122 is located to define a "lowest" position of harness-control panel 16 as shown in FIGS. 11–13. Slot 124 is located to define a "middle" position of harness-control panel 16 as shown in FIGS. 16 and 17. Slot 126 is located to define a "high" position of harness-control panel 16 as shown in FIGS. 18 and 19. Slot 128 is located to define a "highest" position of harness-control panel 16, as shown in FIGS. 20 and 21, wherein an older, larger sized child is restrained in child-restraint seat 10 using an adult vehicle shoulder and lap belt assembly rather than using child-restraint harness 14 provided in child-restraint seat 10.

A pair of outer vertical bar-anchor members 112 of seat shell 18 are also coupled to the rear side of back support portion 26 to lie in space 110 in spaced-apart relation to each other so that center vertical bar-anchor member 100 is positioned between the outer bar-anchor members 112. Similar to center bar-anchor member 100, an upper end of each outer bar-anchor member 112 is coupled to an outer end of horizontal back rib 118. Each outer bar-anchor member 112 further includes a plurality of panel height locators such as vertically spaced-apart slots (e.g. slots 222, 224, 226 and 228) for receiving belt-support bar 78 therein. The vertically spaced-apart slots 222, 224, 226, and 228 of each outer bar-anchor member 112 correspond to the vertically spaced-apart slots 122, 124, 126, and 128 of center bar-anchor member 100.

As mentioned above, each arm 88 of handle bar 80 includes guide channel 96 for receiving one end (or a portion) of belt-support bar 78 therein and for supporting belt-support bar 78 for back-and-forth sliding movement relative to handle bar 80 as belt-support bar 78 is moved into and out of any of the slots 122, 124, 126, and 128 formed in center bar-anchor member 100 and slots 222, 224, 226, and 228 of both outer bar-anchor members 112 during movement of harness-control panel 16 relative to seat shell 18. Springs 86 are arranged to urge belt-support bar 78 in a direction toward back support portion 26 of seat shell 18 to cause belt-support bar 78 to be retained in one of the slots 122, 124, 126, 128 formed in center bar-anchor member 100 upon movement of belt-support bar 78 into such a slot. Therefore, belt-support bar 78 is normally retained in the locked position and thus acts as a locking member for panel-height adjustment mechanism 19. In other words, it is not necessary for locking member or belt-support bar 78 to support shoulder belt portions 34, 36 of child-restraint harness 14, although, in the illustrative embodiments belt-support bar 78 is shown to do so. It is within the scope of this disclosure for adjustment mechanism 19 to include any suitable type of locking member or locking means to preventing the panel 16 from moving up and down relative to seat shell 18.

As mentioned above, panel-height adjustment mechanism 19 permits a user to adjust the height of panel 16 (and shoulder belts 34, 36) relative to bottom seat portion 24 of seat shell 18 in order to accommodate children of various sizes. Further as mentioned above, panel-height adjustment mechanism 19 of seat 10 includes a front-access means of adjusting the height of panel 16 and a rear-access means of adjusting the height of panel 16. Specifically, panel-height adjustment mechanism 19 is accessible by a user from front side 21 of seat 10 and from rear side 23 of seat 10 so that the height of panel 16 may be adjusted when seat 10 is in either a forwardly-facing position on vehicle seat 12 (as shown, for example, in FIG. 6) or a rearwardly-facing position on vehicle seat 12 (not shown). More specifically, belt-support bar 78 of panel-height adjustment mechanism may be moved to an unlocked position disengaged from one of the panel-height locater slots 122, 124, 126, 128 by a user from the front 21 or rear 23 of seat 10.

Illustratively, the front-access means of adjusting panel 16 includes actuators 76 and belt-support bar or locking member 78. Looking now to FIGS. 3–5, each actuator 76 includes a grip 130 an elongated rod 132 coupled to grip 130, and a foot portion 146 coupled to rod 132. Actuators 76 are coupled to a rear side 134 of panel 16 for up and down movement with panel 16. Actuators 76 are therefore positioned adjacent a front surface of back support portion 26. Each rod 132 is received within first and second clips 136, 138 of panel 16 and is further guided by guides 140. Each foot portion 146 is coupled to one end 148 of rod 132. Grip 130 of each actuator 76 is coupled to an opposite end 150 of the respective rod 132. Foot portion 146 is generally positioned at approximately a 90 degree angle to vertical rod 132. Illustratively, foot portion 146 includes a first portion 152 coupled to elongated rod 132, a second portion 154 coupled to first portion 152, and a third portion 156 coupled to second portion 154. As actuators 76 are rotated, foot portion 146 engages belt-support bar 78 to move belt-support bar 78 out of engagement with one of the slots 122, 124, 126 and 128 to the unlocked or disengaged position. Foot portion 146 of each actuator 76 is rotated through respective vertical channels 82, 84 of back support portion 26 in order to engage belt-support bar 78.

As shown in FIGS. 1 and 2, grip 130 of each actuator 76 extends above panel 16 so that each grip 130 is visible and accessible to a user from front side 21 of seat 10. It is contemplated that actuators 76 or similar actuating mechanisms may be positioned in other ways in order to be accessible to a caregiver from front side 21 of seat 10. Each actuator 76 is rotatable about a vertical axis 142 extending along each elongated rod 132, as shown in FIGS. 1–3. In operation, a caregiver grasps each grip 130 and rotates each grip 130 toward the center of seat 10. Normally, each grip extends outwardly away from the center of seat 10, as shown in FIG. 1. Each grip 130 is coupled to corresponding rod 132 so that each rod 132 (along with each foot portion 146) is rotated about axis 142 as well. Illustratively, as viewed from above, the right actuator 76 (looking at FIGS. 3–5) is rotated in a counter-clockwise direction while the left actuator 76 is rotated in a clockwise direction. It is within the scope of this disclosure to provided actuators 76 which rotate in either direction.

As each rod 132 is rotated about each axis 142, the respective foot portions 146 engage belt-support bar 78 and act against the bias of springs 86 to move belt-support bar 78 from the engaged position to the disengaged position to unlock or release panel 16 so that panel 16 (with shoulder belts 34, 36) may be moved up and down relative to bottom seat portion 24. As shown in FIGS. 3–5, third portion 156 of each foot portion 146 engages belt-support bar 78, although, it is within the scope of this disclosure for any portion of each foot portion 146 to engage belt-support bar 78. Once belt-support bar 78 has been moved to the disengaged position and is held there by each foot portion 146, the user may continue to grasp grips 130 and move panel 16 up and down because, as stated above, each lever 76 is coupled to panel 16 for up and down movement therewith. Once panel 16 is at the desired height, user may rotate each lever 76 in the opposite direction to allow belt-support bar 78 to be biased toward back support portion 26 and into any one of the panel-height locator slots 122, 124, 126, 128 desired.

The rear-access means of adjusting the height of panel 16 up and down relative to bottom seat portion 24 includes handle bar 80 and belt-support bar 78 of panel-height adjustment mechanism 19. Handle bar 80, as mentioned before, includes spaced-apart arms 88 coupled corresponding support arms or posts 70 of panel 16 and grip member 92 interconnecting arms 88. Because handle bar 80 is rigidly coupled to panel 16, handle bar 80 is urged to move generally vertically with panel 16 relative to seat shell 18. Handle bar 80 is provided as a support so that a user can grip belt-support bar 78 and grip member 92 of handle bar 80 to move belt-support bar 78 relative to bar-anchor members 100, 112 toward grip member 92 against the bias of springs 86 to release belt-support bar 78 from slot 122, for example, as shown in FIGS. 13–15.

Once belt-support bar 78 is released from engagement with slot 122, panel-height adjustment mechanism 19 with harness-control panel 16 is movable up or down to engage one of the other slots 124, 126, or 128 formed in center bar-anchor member 100. FIGS. 13–15, for example, illustrate the movement of panel-height adjustment mechanism 19 from the first lowest position wherein belt-support bar 78 is received within slot 122 to the second middle position wherein belt-support bar 78 is received within slot 124. As shown in the drawings, shoulder belts 34, 36 are threaded through slots 60, 62 over belt-support bar 78 to lie on belt-support bar 78 on opposite sides of center bar-anchor member 100 so that any raising or lowering of belt-support member 100 relative to center and outer bar-anchor members 100, 112 will change the nominal height 74 (and seat shell entry point) of the first and second shoulder belts 34, 36. Further, belt guides 160 of panel 16 are provided to guide each shoulder belt 34, 36 over belt-support bar 78 after being received though respective belt-receiving slots 60, 62. As shown in FIGS. 3–5, belt guides 160 (shown with portions broken away) are coupled to rear side or surface 134 of back plate 58 and are positioned below each respective slot 60, 62.

Although this disclosure has been described in detail with reference to certain embodiments, variations and modifications exist within the scope and spirit of the disclosure as described and defined in the following claims.

What is claimed is:

1. A child-restraint seat comprising
    a seat shell including a bottom seat portion and a back support portion including a channel formed therein, the seat shell being adapted to be coupled to a vehicle seat by a seat anchor coupled to the vehicle,
    a child-restraint harness coupled to the seat shell,
    a harness-control panel including a belt-receiving opening receiving a shoulder belt portion of the child-restraint harness, the harness-control panel being mounted on the seat shell outside the channel for up and down movement relative to the seat shell to raise and lower the shoulder belt portion of the child-restraint harness with respect to the bottom seat portion, and
    a panel-height adjustment mechanism coupled to the harness-control panel and movable between a locked position to prevent the harness-control panel from moving up and down relative to the seat shell and an unlocked position to allow the harness-control panel to move up and down relative to the seat shell, an actuator coupled to the panel-height adjustment mechanism and positioned forward a front surface of the back support portion and operable to permit locking and unlocking from a front side of the child-restraint seat when the seat is facing forward and is coupled to a vehicle seat by the seat anchor, and a locking member of the panel-height adjustment mechanism being positioned adjacent a rear surface of the back support portion to be accessible to a user from a rear side of the child-restraint seat, the actuator being movable relative to the harness-control panel between a first unlocked position outside the channel formed in the back support portion and a second locked position within the channel of the back support portion.

2. The child-restraint seat of claim 1, wherein the harness-control panel is positioned to lie adjacent to a front surface of the back support portion to cause a child seated in the seat shell to rest against the harness-control panel.

3. The child-restraint seat of claim 1, wherein the locking member is coupled to the harness-control panel and is engaged with the seat shell when the panel-height adjustment mechanism is in the locked position and disengaged from the seat shell when the panel-height adjustment mechanism is in the unlocked position.

4. The child-restraint seat of claim 3, wherein the locking member is biased to engage the seat shell.

5. The child-restraint seat of claim 4, wherein the panel-height adjustment mechanism includes panel-height locators provided in the back support portion and formed to receive the locking member therein when the panel-height adjustment mechanism is in the locked position.

6. The child-restraint seat of claim 4, wherein the shoulder belt portion of the child-restraint harness engages the locking member and is supported for up-down movement with the harness-control panel on the locking member.

7. The child-restraint seat of claim 3, wherein the actuator of the panel-height adjustment mechanism is coupled to the harness-control panel for up and down movement therewith, and wherein the actuator is movable relative to the harness-control panel to disengage the locking member from the seat shell to move the panel-height adjustment mechanism to the unlocked position.

8. A child-restraint seat comprising
a seat shell including a bottom seat portion and a back support portion, the seat shell being adapted to be coupled to a vehicle seat by a seat anchor coupled to the vehicle,
a child-restraint harness coupled to the seat shell,
a harness-control panel including a belt-receiving opening receiving a shoulder belt portion of the child-restraint harness, the harness-control panel being mounted on the seat shell for up and down movement relative to the seat shell to raise and lower the shoulder belt portion of the child-restraint harness with respect to the bottom seat portion, and
a panel-height adjustment mechanism coupled to the harness-control panel and movable between a locked position to prevent the harness-control panel from moving up and down relative to the seat shell and an unlocked position to allow the harness-control panel to move up and down relative to the seat shell, a portion of the panel-height adjustment mechanism being positioned adjacent a front surface of the back support portion to be accessible to a user from a front side of the child-restraint seat, and another portion of the panel-height adjustment mechanism being positioned adjacent a rear surface of the back support portion to be accessible to a user from a rear side of the child-restraint seat,
wherein the panel-height adjustment mechanism includes a locking member coupled to the harness-control panel, the locking member being engaged with the seat shell when the panel-height adjustment mechanism is in the locked position and disengaged from the seat shell when the panel-height adjustment mechanism is in the unlocked position,
wherein the panel-height adjustment mechanism includes an actuator coupled to the harness-control panel for up and down movement therewith, and wherein the actuator is movable relative to the harness-control panel to disengage the locking member from the seat shell to move the panel-height adjustment mechanism to the unlocked position, and
wherein the actuator includes a grip, a rod coupled to the grip, and a foot portion coupled to the rod, and wherein the grip extends above the harness-control panel and is accessible by a user from the front side of the child-restraint seat.

9. The child-restraint seat of claim 8, wherein the foot portion lies at an angle to the rod and is positioned for engagement with the locking member when the actuator is rotated.

10. A child-restraint seat comprising
a seat shell including a bottom seat portion and a back support portion, the seat shell being adapted to be coupled to a vehicle seat by a seat anchor coupled to the vehicle,
a child-restraint harness coupled to the seat shell,
a harness-control panel including a belt-receiving opening receiving a shoulder belt portion of the child-restraint harness, the harness-control panel being mounted on the seat shell for up and down movement relative to the seat shell to raise and lower the shoulder belt portion of the child-restraint harness with respect to the bottom seat portion, and
a panel-height adjustment mechanism coupled to the harness-control panel and movable between a locked position to prevent the harness-control panel from moving up and down relative to the seat shell and an unlocked position to allow the harness-control panel to move up and down relative to the seat shell, a portion of the panel-height adjustment mechanism being positioned adjacent a front surface of the back support portion to be accessible to a user from a front side of the child-restraint seat, and another portion of the panel-height adjustment mechanism being positioned adjacent a rear surface of the back support portion to be accessible to a user from a rear side of the child-restraint seat,
wherein the panel-height adjustment mechanism includes a locking member coupled to the harness-control panel, the locking member being engaged with the seat shell when the panel-height adjustment mechanism is in the locked position and disengaged from the seat shell when the panel-height adjustment mechanism is in the unlocked position,
wherein the panel-height adjustment mechanism includes an actuator coupled to the harness-control panel for up and down movement therewith, and wherein the actuator is movable relative to the harness-control panel to disengage the locking member from the seat shell to move the panel-height adjustment mechanism to the unlocked position, and
wherein the panel-height adjustment mechanism includes another actuator coupled to the harness-control panel, and wherein the actuators are spaced-apart from each other.

11. The child-restraint seat of claim 3, wherein the panel-height adjustment mechanism further includes a handle coupled to the harness-control panel for up and down movement therewith, and wherein the locking member is a bar slidably coupled to the handle for movement in a generally horizontal direction toward and away from the back support portion of the seat shell, and further wherein the handle and the bar are each accessible by a user from the rear side of the seat.

12. The child-restraint seat of claim 11, wherein the handle includes a support arm coupled to the harness-control panel, and wherein the support arm includes a channel for receiving at least a portion of the bar for back and forth movement of the bar within the channel relative to the handle and the harness-control panel.

13. The child-restraint seat of claim 12, wherein the bar is biased toward the back support portion of the seat shell.

14. The child-restraint seat of claim 3, wherein the locking member is a bar extending generally horizontally across at least a portion of the back support portion, and further wherein the shoulder belt portion of the child-restraint harness is supported on the bar for up and down movement therewith.

15. The child-restraint seat of claim 1, wherein the panel-height adjustment mechanism includes a locking member coupled to the harness-control panel and normally engaged with a portion of the seat shell to retain the panel-height adjustment mechanism in the locked position, and an actuator coupled to the harness-control panel, accessible to a user from the front side of the seat, and movable relative to the harness-control panel to move the locking member to a position disengaged from the seat shell.

16. A child-restraint seat comprising a seat shell including a bottom seat portion and a back support portion positioned to lie at an angle to the bottom seat portion, a child-restraint harness coupled to the seat shell, a harness-control panel including a belt-receiving opening receiving a shoulder belt portion of the child-restraint harness, the harness-control panel being mounted on the seat shell for up and down movement relative to the seat shell to raise and lower the shoulder belt portion of the child-restraint harness with respect to the bottom seat portion, a locking member coupled to the harness-control panel for up and down movement therewith, the locking member being movable relative to the harness-control panel between a locked position preventing up and down movement of the harness-control panel relative to the seat shell and an unlocked position allowing up and down movement of the harness-control panel relative to the seat shell, an actuator coupled to the harness-control panel for up and down movement therewith and positioned forward a front surface of the back support portion, the actuator being movable relative to the harness-control panel to engage the locking member and move the locking member from the locked position to the unlocked position, and wherein the actuator is adapted to be operated to the locked and unlocked positions when the child is buckled in the child restraint seat with the child's back against the seat and the child restraint seat is coupled to a vehicle seat in the forward facing position.

17. The child-restraint seat of claim 16, wherein a portion of the actuator extends beyond the harness-control panel to be accessible by a user from a front side of the child-restraint seat.

18. A child-restraint seat comprising a seat shell including a bottom seat portion and a back support portion positioned to lie at an angle to the bottom seat portion, a child-restraint harness coupled to the seat shell, a harness-control panel including a belt-receiving opening receiving a shoulder belt portion of the child-restraint harness, the harness-control panel being mounted on the seat shell for up and down movement relative to the seat shell to raise and lower the shoulder belt portion of the child-restraint harness with respect to the bottom seat portion, a locking member coupled to the harness-control panel for up and down movement therewith, the locking member being movable relative to the harness-control panel between a locked position preventing up and down movement of the harness-control panel relative to the seat shell and an unlocked position allowing up and down movement of the harness-control panel relative to the seat shell, and an actuator coupled to the harness-control panel for up and down movement therewith, the actuator being movable relative to the harness-control panel to engage the locking member and move the locking member from the locked position to the unlocked position, wherein a portion of the actuator extends beyond the harness-control panel to be accessible by a user from a front side of the child-restraint seat, and wherein the actuator includes an elongated rod positioned to extend along a back side of the harness-control panel, a grip coupled to a first end of the rod and positioned to lie above the harness-control panel, and a foot portion coupled to a second end of the rod, and wherein the actuator is rotatable relative to the harness-control panel about an axis along the rod to engage the foot portion of the actuator with the locking member.

19. A child-restraint seat comprising a seat shell including a bottom seat portion and a back support portion positioned to lie at an angle to the bottom seat portion, a child-restraint harness coupled to the seat shell, a harness-control panel including a belt-receiving opening receiving a shoulder belt portion of the child-restraint harness, the harness-control panel being mounted on the seat shell for up and down movement relative to the seat shell to raise and lower the shoulder belt portion of the child-restraint harness with respect to the bottom seat portion, a locking member coupled to the harness-control panel for up and down movement therewith, the locking member being movable relative to the harness-control panel between a locked position preventing up and down movement of the harness-control panel relative to the seat shell and an unlocked position allowing up and down movement of the harness-control panel relative to the seat shell, and an actuator coupled to the harness-control panel for up and down movement therewith, the actuator being movable relative to the harness-control panel to engage the locking member and move the locking member from the locked position to the unlocked position, wherein a portion of the actuator extends beyond harness-control panel to be accessible by a user from a front side of the child-restraint seat, and further including another actuator coupled to the harness-control mechanism, and wherein the actuators are spaced-apart from each other.

20. The child-restraint seat of claim 19, wherein one of the actuators is rotatable relative to the harness-control panel for engagement with the locking member in a clockwise direction and the other actuator is rotatable relative to the harness-control panel for engagement with the locking member in a counterclockwise direction.

21. The child-restraint seat of claim 16, further including a handle coupled to the harness-control panel for up and down movement therewith, and wherein the locking member is coupled to the handle and movable relative to the handle between the locked and unlocked positions.

22. The child-restraint seat of claim 21, wherein the handle includes a channel for receiving at least a portion of the locking member therein, and wherein the locking member moves back and forth within the channel between the locked and unlocked positions.

23. The child-restraint seat of claim 21, wherein the harness-control panel is positioned to lie adjacent to a front surface of the back support portion to cause a child seated in the seat shell to rest against the harness-control panel, the handle is positioned to lie adjacent a rear surface of the back support portion, the handle includes a support arm coupled to the harness-control panel and received within a generally vertical channel formed in the seat shell to allow up and down movement of the harness-control panel and handle relative to the seat shell.

24. The child-restraint seat of claim 16, wherein the back support portion of the seat shell includes a plurality of panel-height locators to couple with the locking member when the locking member is in the locked position.

25. The child-restraint seat of claim 24, wherein the locking member is a bar formed to extend generally horizontally across the back support portion of the seat shell, and wherein the panel-height locators are slots formed in the back support portion and positioned at various heights along the back support portion above the bottom seat portion of the seat shell to receive at least a portion of the locking member therein when the locking member is in the locked position to secure the harness-control panel at a desired height above the bottom seat portion.

26. A juvenile vehicle seat comprising
   a seat shell,
   a headrest coupled to the seat shell for up and down movement relative to the seat shell,
   a child-restraint harness coupled to the seat shell and having a shoulder belt portion coupled to the headrest for up and down movement of the shoulder belt portion with the headrest relative to the seat shell,
   locking means for preventing up and down movement of the headrest relative to the seat shell,
   unlocking means for allowing up and down movement of the headrest relative to the seat shell, and
   wherein the locking and unlocking means are operable by a user from a front side of the seat shell with the child seated upright in and against the seat back and the child restraint seat is coupled to a vehicle seat in the forward facing position.

27. A juvenile vehicle seat comprising
   a seat shell including a bottom seat portion and a back support portion, the seat shell being adapted to be coupled to a vehicle seat by a seat anchor coupled to the vehicle,
   a child-restraint harness coupled to the seat,
   a harness-control panel including a belt-receiving opening receiving a shoulder belt portion of the child-restraint harness, the harness-control panel being mounted on the seat shell for up and down movement relative to the seat shell to raise and lower the shoulder belt portion of the child-restraint harness with respect to the bottom seat portion,
   a locking mechanism coupled to the harness-control panel for up and down movement with the harness-control panel, the locking mechanism being movable relative to the harness-control panel between a locked position to prevent the harness-control panel from moving up and down relative to the seat shell and an unlocked position to allow the harness-control panel to move up and down relative to the seat shell, and
   an actuator coupled to the harness-control panel for up and down movement with the harness-control panel and positioned between the harness-control panel and a front surface of the back support portion of the seat shell, the actuator being rotatable about a vertical axis relative to the harness-control panel between a first position disengaged from the locking mechanism and a second position engaged with the locking mechanism to move the locking mechanism to the unlocked position.

28. A child-restraint seat comprising
   a seat shell including a bottom seat portion and a back support portion, the seat shell being adapted to be coupled to a vehicle seat by a seat anchor coupled to the vehicle,
   a child-restraint harness coupled to the seat shell,
   a harness-control panel including a belt-receiving opening receiving a shoulder belt portion of the child-restraint harness, the harness-control panel being mounted on the seat shell for up and down movement relative to the seat shell to raise and lower the shoulder belt portion of the child-restraint harness with respect to the bottom seat portion,
   a panel-height adjustment mechanism coupled to the harness-control panel and movable between a locked position to prevent the harness-control panel from moving up and down relative to the seat shell and an unlocked position to allow the harness-control panel to move up and down relative to the seat shell, the panel-height adjustment mechanism including an actuator coupled to the harness-control panel for up and down movement therewith and positioned forward a front surface of the back support portion and the actuator is adapted to be operated to the locked and unlocked positions when the child is buckled in the child restraint seat with the child's back against the seat and the child restraint seat is coupled to a vehicle seat in the forward facing position.

29. A juvenile vehicle seat comprising
   a seat shell including a bottom seat portion and a back support portion, the seat shell being adapted to be coupled to a vehicle seat by a seat anchor coupled to the vehicle,
   a child-restraint harness coupled to the seat,
   a harness-control panel including a belt-receiving opening receiving a shoulder belt portion of the child-restraint harness, the harness-control panel being mounted on the seat shell for up and down movement relative to the seat shell to raise and lower the shoulder belt portion of the child-restraint harness with respect to the bottom seat portion,
   a locking mechanism coupled to the harness-control panel for up and down movement with the harness-control panel, the locking mechanism being movable relative to the harness-control panel between a locked position to prevent the harness-control panel from moving up and down relative to the seat shell and an unlocked position to allow the harness-control panel to move up and down relative to the seat shell, and
   an actuator rotatable about a vertical axis relative to the harness-control panel between a first position disengage to move the locking mechanism and a second position engaged with the locking mechanism to move the locking mechanism to the unlocked position.

* * * * *